United States Patent [19]
Butler

[11] 3,905,120
[45] Sept. 16, 1975

[54] SCUFF GAUGE
[75] Inventor: Louis L. Butler, Baton Rouge, La.
[73] Assignee: Bear Manufacturing Corporation, Rock Island, Ill.
[22] Filed: Oct. 3, 1973
[21] Appl. No.: 403,045

Related U.S. Application Data
[63] Continuation of Ser. No. 234,840, March 15, 1972, abandoned.

[52] U.S. Cl. ............................................. 33/203.14
[51] Int. Cl.² ......................................... G01B 5/255
[58] Field of Search ....... 33/203.12, 203.13, 203.14, 33/147 N

[56] References Cited
UNITED STATES PATENTS

| | | | |
|---|---|---|---|
| 1,883,180 | 10/1932 | Weaver | 33/203.14 X |
| 1,950,994 | 3/1934 | Musselman | 33/203.14 X |
| 2,033,352 | 3/1936 | Nielsen | 33/203.14 |
| 2,833,046 | 5/1958 | Jeglum | 33/147 N |
| 2,876,551 | 3/1959 | Bowlby | 33/147 N |
| 2,883,762 | 4/1959 | MacMillan | 33/203.14 |
| 3,309,776 | 3/1967 | Papazian | 33/203.14 |

Primary Examiner—William D. Martin, Jr.
Attorney, Agent, or Firm—Roy E. Petherbridge; Robert L. Lindgren; Edward D. Gilhooly

[57] ABSTRACT

A scuff gauge for determining the toe angles of vehicular wheels employs a novel reciprocating cam for rapid, proper positioning of a wheel-sensing plate and utilizes a mechanical-electrical transducer for providing a direct calibrated meter readout of the toe angle as determined by the displacement of the sensing plate.

8 Claims, 9 Drawing Figures

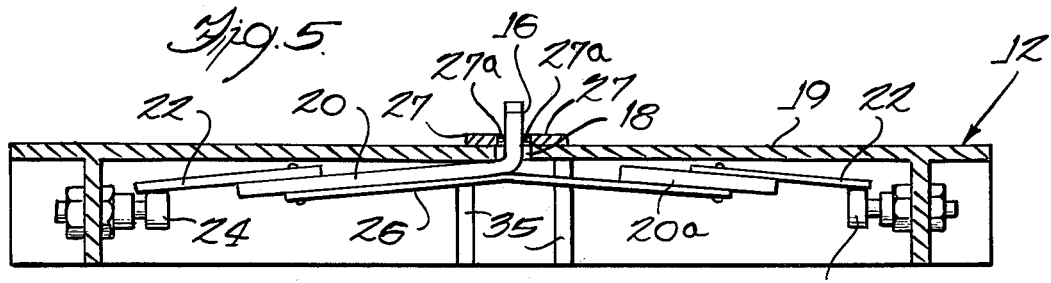
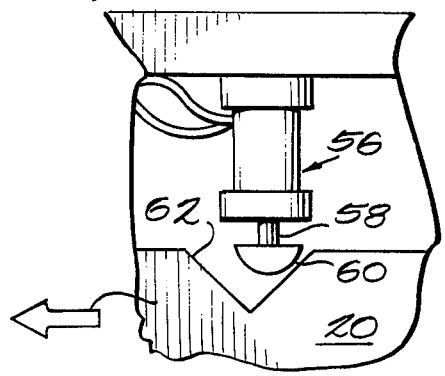
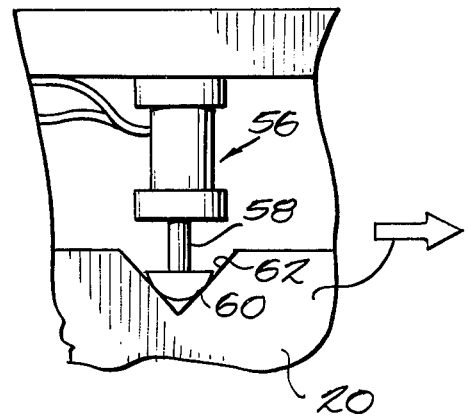
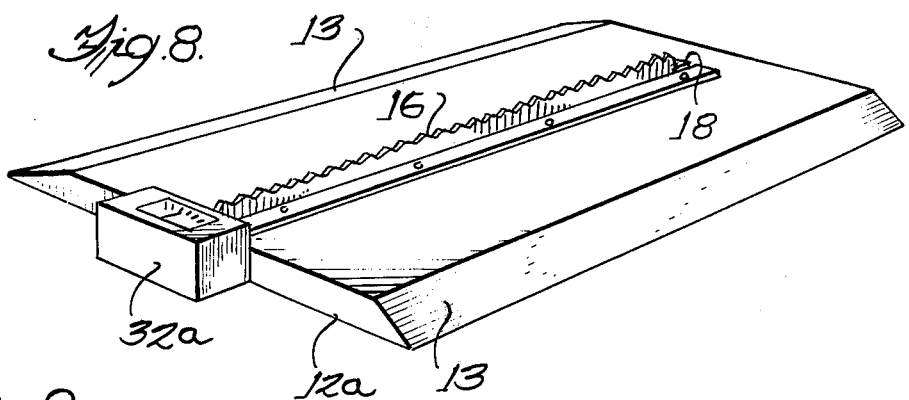
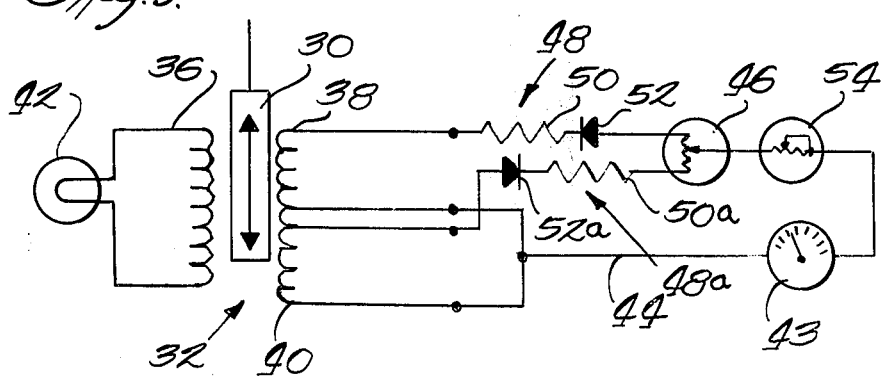

SCUFF GAUGE

This is a continuation of application Ser. No. 234,840 filed Mar. 15, 1972 now abandoned.

This invention relates to an improved scuff gauge for measuring the toe angles of vehicular wheels and which provides a direct accurate readout of the toe angle value.

Scuff gauges for ascertaining the toe angles of vehicular wheels i.e., the angle of the plane of rotation of the wheel to the direction of movement of the wheel, are known in the art. Such gauges employ mechanical linkage arrangements which transmit the degree of wheel misalignment to an indicator means. Such gauges are also of a variety of constructions and are subject to a number of objections as to their operation and accuracy.

Prior art gauges are quite often cumbersome, requiring large areas for housing the linkage assemblies. The use of linkages is also subject to a variety of malfuctions, such as linkage freezing and jamming, and inaccuracy in readout as may be occasioned by large temperature differentials in the ambient atmosphere in which the gauges are located. Great care must also be excercised with such prior art gauges to guard against spillage of liquids in the vicinity of the gauge linkages, which would occasion sticking at the linkage pivots. Use of such gauges employing mechanical linkages which are not functioning properly, can result in linkage bending or other misalignment necessitating a change in parts and gauge recalibration.

It is an object of this invention to avoid prior art difficulties above set forth, which result from the use of linkages, by providing a scuff gauge utilizing a mechanicalelectrical transducer. The transducer enables sensing plate movement to be electrically translated into a meter readout indicative of the degree of wheel misalignment and to be conveniently displayed for ready reading.

It is another object of this invention to provide a scuff gauge assembly which may be readily incorporated in an automotive life rack, occupying in minimum amount of space therein, or which may be mounted on a garage floor or the like providing substantially no surface obstructions except for small sensing bar housings.

It is still another object of this invention to provide a scuff gauge construction which may readily return the tire-sensing bars of the gauges to a zero position after use, from a remote-control position.

It is another object of this invention to provide a unique scuff gauge assembly which is composed of readilyavailable components having low initial cost, while providing accuracy of readout and ready recalibrations when desired.

The above and other objects of this invention will become more apparent from the following detailed descriptions when read in the light of the accompanying drawings and appended claims.

In one embodiment of this invention an upwardlybiased, wheel-sensing plate is located on a vehicle runway over which a vehicular wheel is driven at right angles thereto. The lateral displacement of the sensing plate, occasioned in the course of being driven down by the wheel, is indicative of the toe angle of the wheel and any misalignment thereof. The sensing plate movement moves the movable core of a transducer. The core, in its new position, provides an electrical signal which is directly read on a calibrated meter. The meter reading thus indicates the degree of wheel misalignment.

For a more complete understanding of this invention reference will now be made to the drawings wherein:

FIG. 5 is an enlarged sectional view taken on line 5—5 of FIG. 3;

FIG. 6 is an enlarged fragmentary view of a zeroing cam plunger illustrated prior to engaging a misaligned base portion connected to a sensing plate;

FIG. 7 is a view similar to FIG. 6 illustrating the cam plunger in centering position relative to an engaged base plate portion;

FIG. 8 is a perspective view of a scuff-plate assembly adapted to be employed on a supporting floor surface; and FIG. 9 is a wiring diagram of a circuit which may be employed in a scuff gauge made in accordance with this invention.

Figure 1:
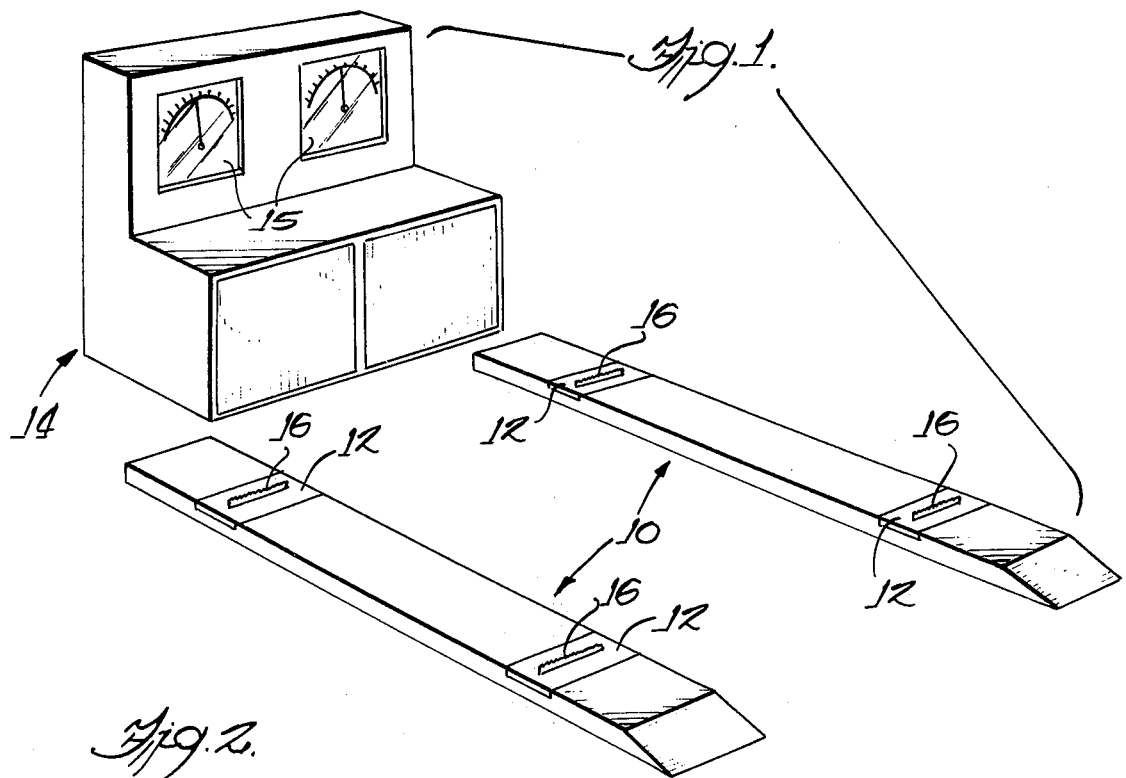
FIG. 1 is a perspective view of a runway and cabinet assembly employing the scuff gauge of this invention.

Referring now more particularly to FIG. 1, twin runways, or tracks 10, incorporating therein housings 12 for transverse sensing plates 16, are illustrated. The runways may comprise elements in a lifting rack enabling an auto, or similar vehicle, to be elevated for inspection and repair of the vehicle undersurface.

A cabinet 14 is illustrated having mounted therein twin readout meters 15.

Figure 2:
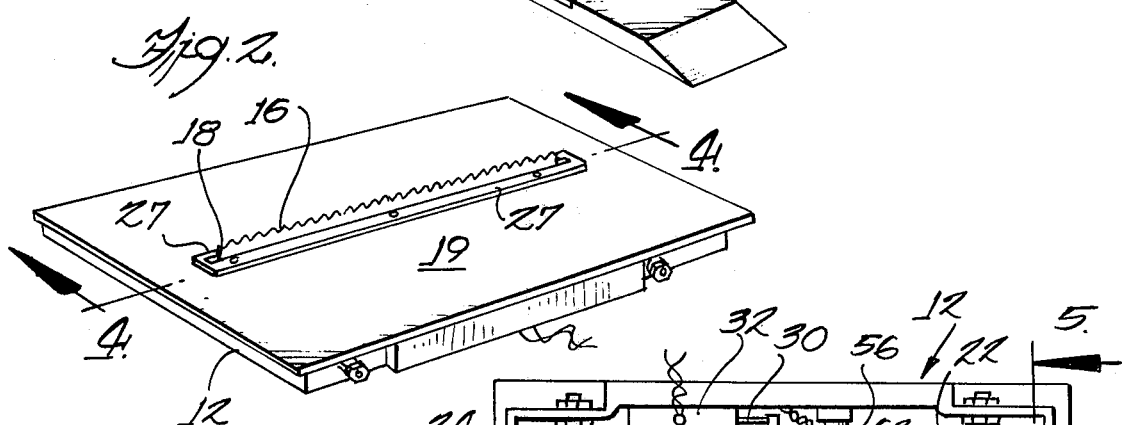
FIG. 2 is an enlarged perspective view of a sensing plate illustrated in a housing which may be incorporated in the runways of FIG. 1.
Figure 4:
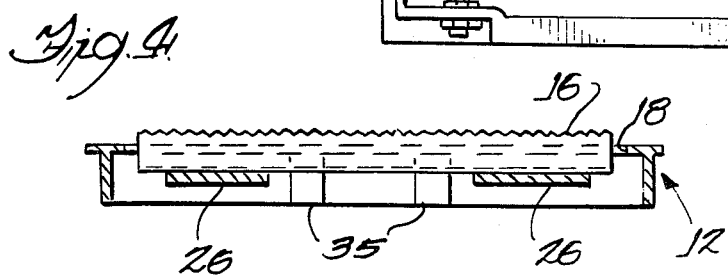
FIG. 4 is a sectional view taken on line 4—4 of FIG. 2.

Each of the scuff plate housings 12 has centrally and transversely mounted therein the vertically-disposed, toothed sensing plate 16, more clearly seen in FIGS. 2 and 4, which extends through a slot 18 formed in upper surface plate 19 of each housing. Each plate 16 is formed intergrally with, or may be fixedly secured to, an underlying base portion 20 to which projecting tabs 22 are attached for moving over support rollers 24 along one side of the housing 12 in the normal course of gauge operation. A spaced base plate portion 20a has similar tabs 22 engaging spaced support rollers 24 arranged along the opposite side of the housing 12. Two spring plates 26 join the bars 20 and 20a into a frame unit which is supported on the rollers 24 for adjustable movement longitudinally of the plate or bar 16. The spring plates impart an upward bias (see FIG. 5) to the base portion 20 and connected sensing plate 16. Adjustable guide rails 27 are positioned with bearing pins 27a adjacent opposite sides of the blade or bar 16 for accurate lateral guiding and support of this bar.

Fixedly secured to the undersurface of each base portion 20 within each housing 12, is a connecting arm 28 which transmits any lateral movement of overlying sensing plate 16 and connected base portion 20 to linearly reciprocable core 30 of a mechanical-electrical transducer 32. The body portion of transducer 32 is clamped in fixed position in the housing 12 by means of clamp 34.

Figure 3:
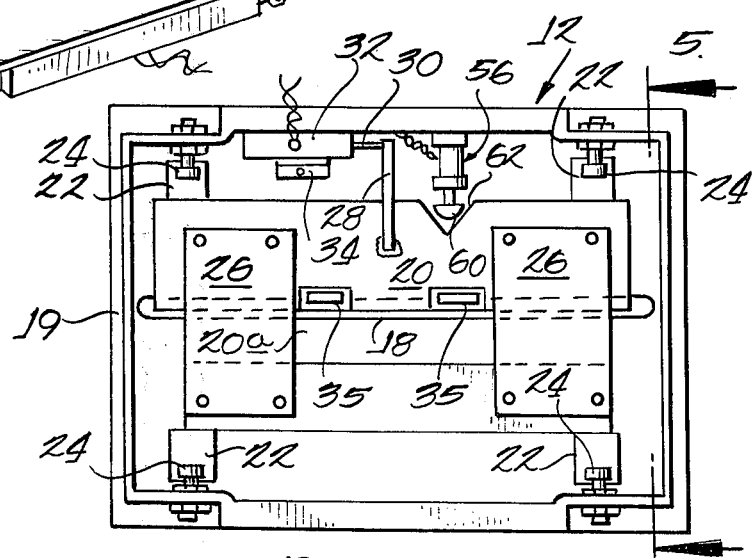
FIG. 3 is a bottom view of the housing illustrated in FIG. 2.

Thus in the normal course of toe angle determination, a pair of automobile wheels are driven over a pair of the sensing plates 16 of the runways 10. Each toothed sensing plate 16 will be driven downwardly and simultaneously laterally moved in accordance with the angular disposition of the respective wheel to its direction of travel. The supporting base frame 20, 20a moves accordingly over rollers 24. Supports 35, seen more clearly in FIGS. 3 through 5, assist in supporting the slotted tops 19 of each housing 12.

As the base plate 20 moves laterally, core 30 of transducer 32, is simultaneously moved longitudinally by connecting arm 28. The movement of the core 30 is directly translated into a meter readout, as will hereinafter become apparent.

Referring to the wiring diagram of FIG. 9, it will be seen that the transducer 32 includes a primary coil 36, with two secondary coils 38 and 40 positioned side by side longitudinally of the transducer body. A power source 42, such as 7.5 volt a.c., is connected to the primary coil 36. Appropriate electrical components are connected in circuit with the two secondary coils 38 and 40 to provide a readout on meter 43 in accordance with the linear displacement of the core 30. The indicator preferably is calibrated to provide a direct indication of the displacement of the core 30 from its center position and thus of the scuff quantity measured, e.g., feet per mile (lateral drift in feet from a true axial course as the auto travels 1 mile).

One side of each of the transformers 38 and 40 is connected to a common conductor 44 which is connected to the meter 43. The opposite leg of coil 38 is connected to a potentiometer 46 through a half-wave rectifier 48 comprising a resistor 50 and a diode 52. The corresponding leg of coil 40 is similarly connected to the potentiometer 46 through a half-wave rectifier 48a comprising a resistor 50a and diode 52a. The output of the potentiometer 46 is connected to a second potentiometer or variable resistor 54, which, in turn, is connected to the opposite side of the meter 43. The meter 43 is a centerpoint milliammeter or galvanometer type meter, which will indicate the center, "zero" or "null" position when the bar 16 is centered, and reflect the direction and distance of linear displacement of the bar 16 when the bar is moved by a vehicle wheel passing thereover.

A pneumatic cylinder centering unit 56 (see FIGS. 6 and 7) is provided to move the sensing plate 16 and connected plate portions to the center reference position. The centering plunger 58 has a rounded cam head 60 which engages the sides of a V-notch 62 formed in plate 20 to effect this centering action. Thereafter, the plunger is retracted, leaving sensing plate 16 in the desired transverse disposition to begin each wheel test.

The cylinder alignment device 56 provides convenient remote operative means for returning the gauge to its center or null position after each reading. The cylinder 56 may be operated hydraulically or pneumatically, with any appropriate remote control, such as a foot switch, or a hand switch on the control panel, which operates a solenoid or other device for selectively admitting fluid under pressure of the cylinder. The cylinder is a spring-return device so that it returns to its retracted position as soon as the fluid pressure is shut off and the cylinder vented.

The basic calibration of the scuff gauge relative to the readout meter is carried out by the steps of first actuating the unit 56 to center the plate 16. The clamp 34 holding the body of the transducer 32 is then loosened and, with power applied to the control circuit, the transducer body (coils 36, 38 and 40) is adjusted linearly until the meter 43 is at its center or zero position. Clamp 34 is then tightened to retain the transducer body in this zero position. The potentionmeter 46 subsequently may be adjusted, as necessary, to effect fine adjustment of the control circuit connected to the two secondary coils 38 and 40 for centering the meter reading at the center or zero position of the scuff bar.

For calibration of the circuitry in accordance with predetermined indicia on the meter 43, the sensing plate 16 is then displaced a known distance, e.g., three-thirtyseconds inches, which is equal to 55 feet per mile of scuff. The variable resistor 54 is then adjusted until the meter 43 indicates the correct predetermined value.

The last-mentioned calibrating adjustments can be repeated at any time in the field. For instance, at any time the operator notes that the meter is not returning to its zero position when the sensing plate 16 is centered, the potentiometer 46 can be adjusted, as by an appropriate control knob, to readjust the secondary coil outputs. Also, the readout calibration can be checked and corrected at any time by the simple expedient of displacing the plate 16 a known distance from its center position, and adjusting the variable resistor 54, as by an appropriate accessible control, in the same manner referred to above.

The above-described scuff gauge, in addition to being incorporated in the rack housings 12 of FIGS. 1 through 5, may be employed as a separate portable unit on a supporting floor surface, as in FIG. 8. FIG. 8 illustrates a scuff gauge housing 12a having opposed, tapered ends 13 and an attached meter housing 32a. The remaining gauge components are as above-described in connection with gauge housing 12.

It is seen from the foregoing, that a novel scuff gauge has been provided employing no mechanical readout linkages, but utilizing a mechanical-electrical transducer to translate mechanical movement directly into a responsive signal for remote meter reading. The novel centering units provide for instantaneous return of the sensing plates to the initial position or center by remote control.

It is apparent from FIG. 1, that gauges may be employed for each wheel of a vehicle by utilizing four sensing plate assemblies. Readout meters 15 may, of course, be in electrical communication with more than one sensing plate circuit.

A mechanical-electrical transducer, which may be utilized in the embodiment described above, is a Model 225A linear position transducer manufactured by Robinson-Halpern of West Conshohocken, Pennsylvania.

It will be apparent to those skilled in the art that other modifications and embodiments of the specific apparatus disclosed herein may be made without departing from the spirit and scope of the invention. Particular construction and fabrication details of one embodiment are disclosed only by way of example, and the various components may be fabricated and assembled in other configurations.

It will be seen that improvements have been provided which meet the aforestated objects.

While a particular embodiment of this invention is shown and described herein, it will be understood, of course, that the invention is not limited thereto, since many modifications may be made by those skilled in the art, particularly in light of the teachings herein. It is contemplated, therefore, by the appended claims to cover any such modifications as fall within the true spirit and scope of this invention.

What is claimed is:

1. A scuff gauge comprising:
   a laterally movable sensing plate adapted to engage a vehicular tire;
   a plate housing including a slot therein, said sensing plate being vertically disposed and protruding through said slot, said slot being of greater length than said plate length;
   a horizontally disposed base portion supportably mounted over rollers carries and mounts said sensing plate whereby said sensing plate and attached base portion may move laterally, said base portion having an edge portion with a notch formed therein;
   a reciprocally movable cam being mounted adjacent said notch and being movable into an extended position whereby said sensing plate is moved to a predetermined reference position;
   mechanical-electrical transducer means operatively connected to said sensing plate for converting the lateral movement of said sensing plate into an electrical signal; and
   means connected to said transducer means for providing a readout of the degree of wheel misalignment proportional to the electrical signal supplied by said transducer means;

2. The gauge of claim 1 in which said transducer means includes a linearly variable differential transformer comprising a linearly reciprocally movable core rigidly connected to said sensing plate whereby movement of said plate effects a corresponding core movement.

3. The gauge of claim 2 wherein said transformer includes secondary coils located relative to said core to provide an electrical signal when said sensing plate is displaced from a predetermined position, such signal being responsive to the direction and distance of such displacement.

4. The gauge of claim 3 in which said means for providing a readout comprises a centerpoint milliammeter.

5. The guage of claim 3 including a potentiometer connected between said secondary coils and said readout means for calibrating adjustment of the readout signals from said coils.

6. The gauge of claim 2 in which variable resistor means is connected in series between said transducer and said readout means, whereby said readout means may be readily recalibrated.

7. The gauge of claim 1 wherein the body of said transducer is provided with adjustable clamp means for adjustably positioning said transducer in said gauge.

8. A lift rack construction comprising twin runways having four scuff gauges as recited in claim 1 located so as to be contacted by all four wheels of an automotive vehicle in the course of moving onto said lift rack.

* * * * *

UNITED STATES PATENT OFFICE
CERTIFICATE OF CORRECTION

Patent No. 3,905,120  Dated September 16, 1975

Inventor(s) Louis L. Butler

It is certified that error appears in the above-identified patent and that said Letters Patent are hereby corrected as shown below:

Column 1, lines 33 and 34, "mechanicalelectrical" should read -- mechanical-electrical --; line 51, "readilyavailable" should read -- readily-available --; lines 59 and 60, "upwardlybiased," should read -- upwardly-biased, --. Column 4, line 1, "zero" should read -- "zero" --; line 3, "zero" should read -- "zero" --; lines 10 and 11, "threethirtyseconds" should read -- 3/32", --.

Signed and Sealed this eleventh Day of May 1976

[SEAL]

Attest:

RUTH C. MASON
Attesting Officer

C. MARSHALL DANN
Commissioner of Patents and Trademarks